(12) United States Patent
Ananthakrishnan

(10) Patent No.: US 7,826,832 B1
(45) Date of Patent: Nov. 2, 2010

(54) CALL STORAGE IN REMOVABLE MEMORY

(75) Inventor: Ganesh Ananthakrishnan, Federal Heights, CO (US)

(73) Assignee: Avaya Inc., Basking Ridge, NJ (US)

( * ) Notice: Subject to any disclaimer, the term of this patent is extended or adjusted under 35 U.S.C. 154(b) by 958 days.

(21) Appl. No.: 11/537,450

(22) Filed: Sep. 29, 2006

(51) Int. Cl.
 *H04M 3/42* (2006.01)
(52) U.S. Cl. ............ 455/417; 455/414.1; 455/416; 455/445; 455/558; 379/210.01; 379/212.01
(58) Field of Classification Search ............... None
 See application file for complete search history.

(56) References Cited

U.S. PATENT DOCUMENTS

| | | | |
|---|---|---|---|
| 7,106,848 B1* | 9/2006 | Barlow et al. | 379/212.01 |
| 2003/0199288 A1 | 10/2003 | Bodnar et al. | |
| 2004/0097264 A1 | 5/2004 | Bodnar et al. | |
| 2004/0203674 A1* | 10/2004 | Shi et al. | 455/415 |
| 2006/0073848 A1* | 4/2006 | Kwon | 455/558 |
| 2006/0115066 A1* | 6/2006 | Levien et al. | 379/210.01 |
| 2007/0191006 A1* | 8/2007 | Carpenter | 455/435.2 |
| 2007/0263828 A1* | 11/2007 | Lee et al. | 379/212.01 |

FOREIGN PATENT DOCUMENTS

WO 2005091568 9/2005

* cited by examiner

*Primary Examiner*—Vincent P Harper
*Assistant Examiner*—Daniel Nobile
(74) *Attorney, Agent, or Firm*—Sheridan Ross P.C.

(57) ABSTRACT

Systems and methods for transferring or conferencing a call between user-accessible communication endpoints are provided. In particular, information related to a call in progress or a connection in progress is stored in removable memory associated with a first user-accessible communication endpoint. The user then removes the removable memory from the first user-accessible communication endpoint, and places it in a second user-accessible communication endpoint. The second user-accessible communication endpoint then calls a network authority, and provides the call information stored on the removable memory to the network authority. In response to receiving the call information, the network authority forks the call to the second user-accessible communication endpoint. The first user-accessible communication endpoint can then be disconnected.

20 Claims, 2 Drawing Sheets

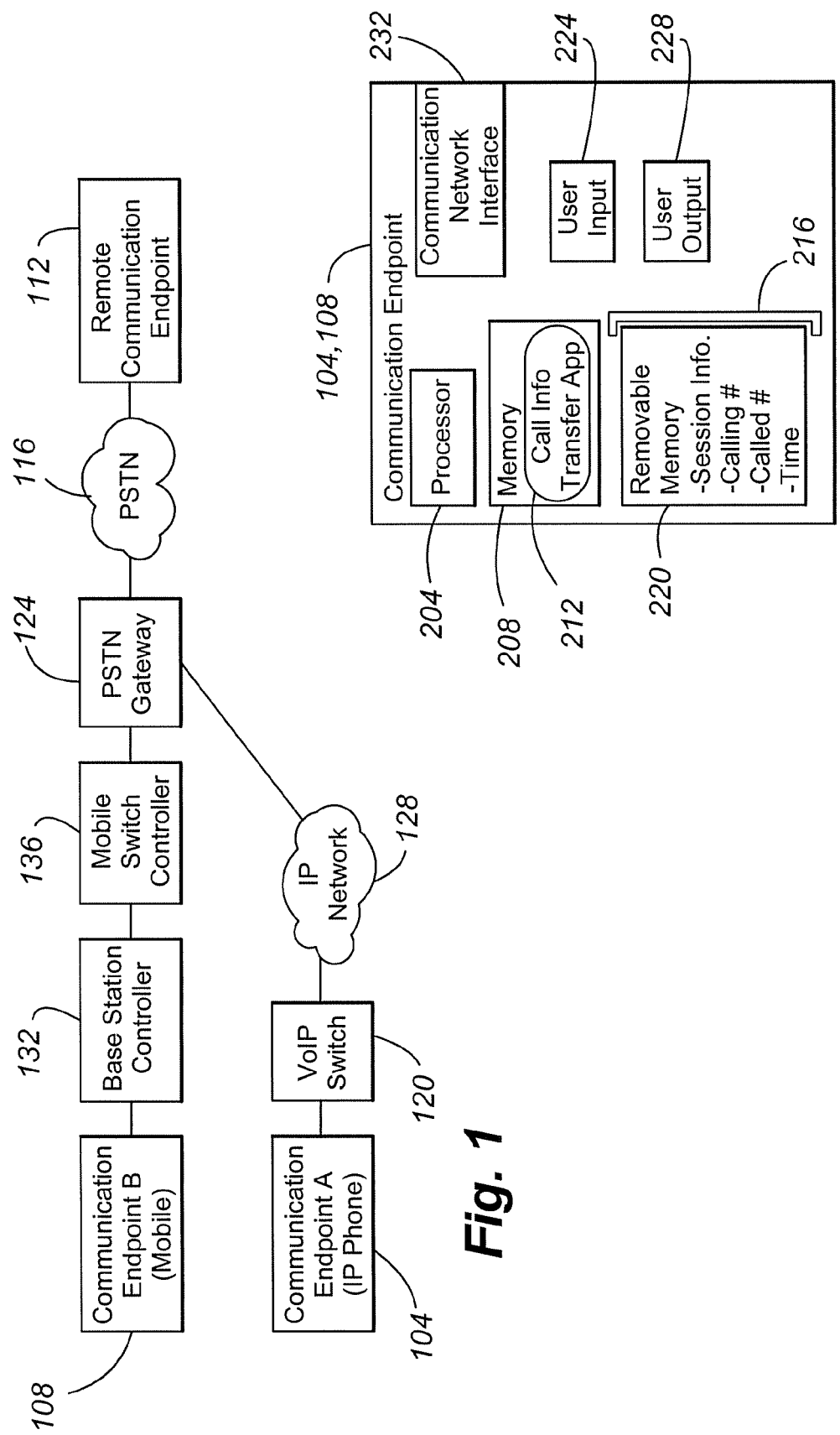

CALL STORAGE IN REMOVABLE MEMORY

FIELD

The transfer or conference of calls in progress from one communication device to another using removable memory is provided.

BACKGROUND

A large variety and number of communication devices are currently available. For example, many consumers carry a wireless (e.g., a cellular) telephone that is used in addition and as a complement to land line telephones at the user's workplace and home. In addition, different communication technologies may be used to provide connections to communication endpoints. For example, in addition to plain old telephones (POTs) interconnected to the public switched telephony network (PSTN), telephony communications can be established using Internet Protocol (IP) soft or hard phones. Each of these different types of communication devices and communication technologies have advantages and disadvantages relative to other technologies. For instance, cellular telephones allow a user to change their location while carrying on a telephone call. Therefore, a cellular phone may be preferred to a landline when the user wants to maintain a telephone call while changing locations. However, cellular telephones are often more expensive to use than landline telephones. Therefore, if a user does not need to be able to change location, a landline telephone may be preferred.

Because of the different relative advantages and disadvantages of different communication devices and associated communication technologies, it would be desirable to allow for in-progress telephone calls or other active communication sessions to be transferred between devices. Currently, call forwarding and conferencing capabilities are supported by many communication systems. However, transferring a call using call forwarding or conferencing requires that the number of the communication device to which the call is to be forwarded or that is to be added to a call be dialed. In addition, conventional systems can either perform call transfer or call forwarding with respect to a call, but not both. Also, transferring a call from a cellular phone to a land line phone is usually not supported. In addition, a user must wait until a call is transferred, which takes time. As a further disadvantage of conventional systems, a call involving a cellular telephone that is forwarded can be disconnected if the cellular telephone battery dies, enters a location that does not have wireless network coverage, or enters an area in which it is roaming. Therefore, such systems are too cumbersome to use to transfer calls from one communication device of a user to another communication device of the user for purposes such as convenience or a more favorable billing plan.

SUMMARY

The present invention is directed to solving these and other problems and disadvantages of the prior art. According to embodiments of the present invention, calls can be seamlessly transferred between communication devices, or multiple communication devices can be joined to a conference call, by transferring call information between the devices using removable memory. More particularly, a call is placed from or received at a first communication device, and call information related to that call is stored in removable memory. The removable memory is then removed from the first communication device and placed in a second communication device. The second communication device passes the call information to a network device that identifies the first call from the provided information. The network device then forks the call to the second communication device. The call with respect to the first communication device can be terminated by placing the first communication device on hook.

In accordance with embodiments of the present invention, the communication devices comprise voice or video telephony devices that have provision for removable memory. For example, removable memory in the form of a flash memory card can be received by the communication devices. Accordingly, the transfer of call information between the first and second communication devices can be effected by a user who physically moves the memory from the first communication device to the second communication device.

The present invention allows a user to move calls from one communication device to another. Accordingly, a user can select the communication device having the best set of attributes for a particular call, such as portability, a low billing rate and/or convenience. Moreover, embodiments of the present invention can be used to maintain the privacy and confidentiality of communication and device information, as information related to the second communication device either through caller I.D. information or otherwise is not provided to a remote communication device participating in the call.

These and other advantages and features of the present invention will become more readily apparent from the following description of illustrative embodiments of the invention, taken together with the figures.

BRIEF DESCRIPTION OF THE DRAWINGS

FIG. 1 is a block diagram of a communication arrangement in accordance with embodiments of the present invention;

FIG. 2 is a block diagram of a communication endpoint in accordance with embodiments of the present invention.

DETAILED DESCRIPTION

Figure 3:
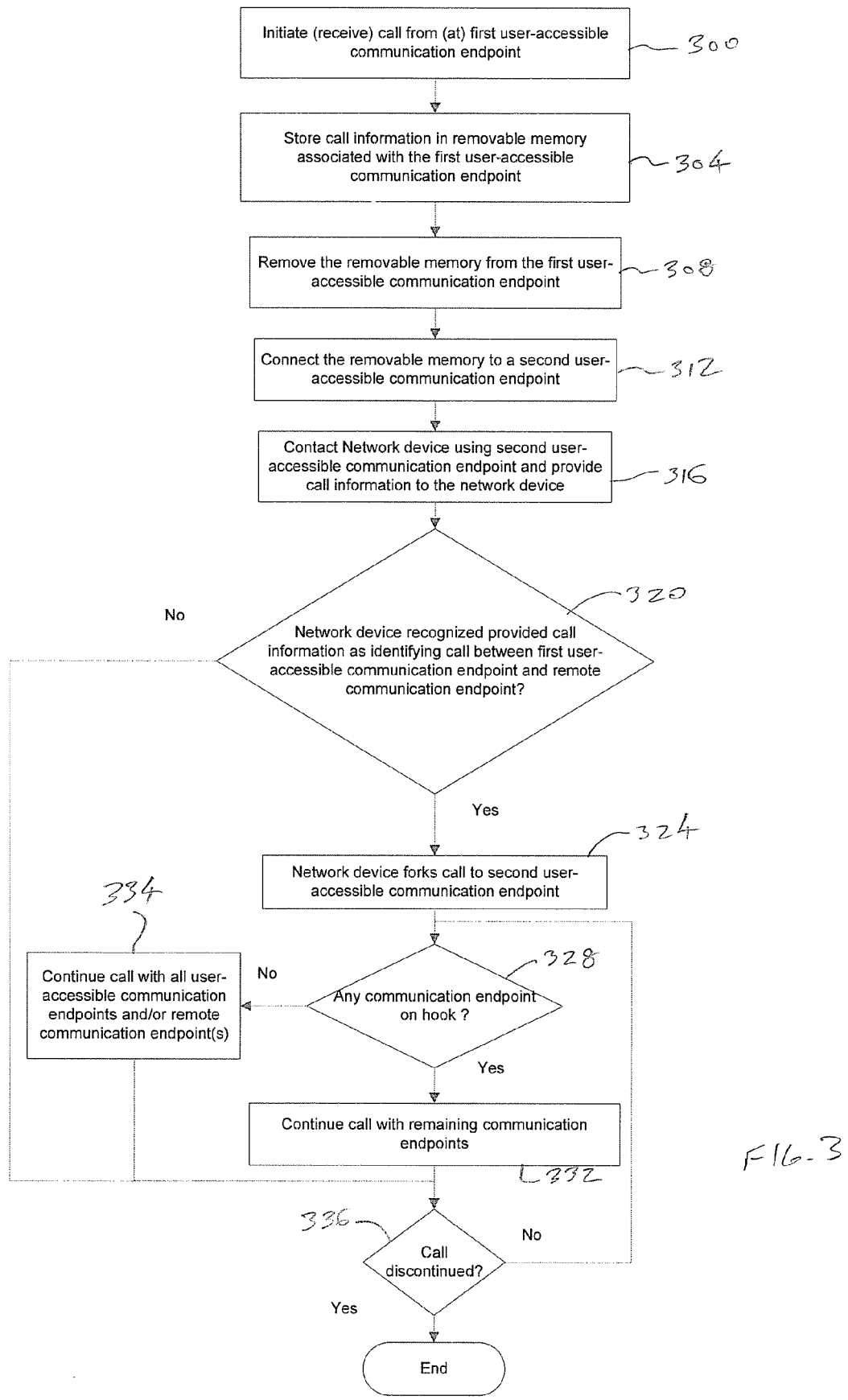
FIG. 3 is a flow diagram illustrating a process for moving a call from one communication endpoint to another in accordance with embodiments of the present invention.

FIG. 1 is a block diagram of an illustrative communication arrangement in accordance with embodiments of the present invention. In general, the communication arrangement includes a number of user-accessible communication endpoints 104, 108 interconnected to a remote communication endpoint 112 by at least a first communication network 116. As shown in the example arrangement in FIG. 1, the user-accessible communication endpoints 104, 108 may be interconnected to the remote communication endpoint 112 through different networks and/or network paths. Furthermore, the user-accessible communication endpoints 104, 108 may comprise different communication endpoint types.

As an example, a first of the communication endpoints 104, denoted in FIG. 1 as communication endpoint A, may comprise an Internet protocol (IP) telephone. Moreover, the Internet protocol telephone may comprise a hardware device, or a soft telephone, for instance running on a general-purpose computer. The first user-accessible communication endpoint 104 may be a wire line device, for instance using a wired Ethernet interface. Alternatively, the first user-accessible communication endpoint 104 may utilize a wireless communication interface. Where the first user-accessible communication endpoint 104 comprises an IP telephone, it may be interconnected to a voice over Internet protocol switch 120.

The VoIP switch may in turn be connected to a public switched telephony network gateway 124 via an Internet protocol network 128.

As another example, the user-accessible second communication endpoint 108 (denoted in FIG. 1 as communication endpoint B) may comprise a mobile telephony device, such as a cellular telephone. The second communication endpoint 108 may communicate with a base station controller 132, for example comprising a cellular telephony network base station. As can be appreciated by one of skill in the art, the particular base station 132 with which a cellular telephone 108 is in communication may change, for example as the user changes their geographic location. The base station controller 132 may in turn be connected to a mobile network switch controller 136, and via the switch controller 136 to the PSTN gateway 124, or to another PSTN gateway.

When a call is established between one of the user-accessible communication endpoints 104 or 108 and the remote endpoint 112, information related to the call is known. By transferring that information between the user accessible communication endpoints 104 or 108, a user-accessible communication endpoint 104 or 108 that was not originally a party to the call can be added to the call. More particularly, a user-accessible communication endpoint 104 or 108 not originally a party to the call can join the call by calling a communication network authority, such as a PSTN gateway 124, a switch 120, or another switch provided as part of or in association with the PSTN 116 or the IP network 128, and providing the call information. The network authority then recognizes the parties from the provided call information, and permits the new user-accessible communication endpoint 104 or 108 to join the call. Because only the active user-accessible communication endpoints 104, 108 are billed for a call, transfer to the new user-accessible communication endpoint 104 or 108 can be completed by placing the original user-accessible communication endpoint 104 or 108 on hook.

With reference now to FIG. 2, a user-accessible communication endpoint 104, 108 is illustrated in functional block diagram form. The components may include a processor 204 capable of executing program instructions. Accordingly, the processor 204 may include any general purpose programmable processor or controller for executing application programming. Alternatively, the processor may comprise a specially configured application specific integrated circuit (ASIC). The processor 204 generally functions to run programming code implementing various functions performed by the related user-accessible communication endpoint 104, 108. For example, such functions may include the storage of call information, and/or the initiation of a call to a network authority to present information related to a call in progress (or a connection in progress) as described herein. A user-accessible communication endpoint 104, 108 may additionally include memory 208, for use in connection with the execution of programming by the processor 204, and for the temporary or long-term storage of data or program instructions. For example, the memory 208 may be used to store application programming or a set of instructions comprising a call information transfer application 212 for execution in connection with the processor 204.

In addition, a user-accessible communication endpoint 104, 108 includes removable-memory slot, port or receptacle 216 for operatively interconnecting the user-accessible communication endpoint 104, 108 to removable memory 220. The removable memory 220 is used, in accordance with embodiments of the present invention, to store call information related to a call in progress (or a connection in progress). The call information that is stored can comprise session information, such as the status of the call (e.g., in progress or connection in progress), the telephone number of the calling device, the telephone number of the called device, and the time at which the call was placed. Additional information can also be stored if the endpoint is a VoIP endpoint, such as header or other information that may be required to complete the call. As described herein, the removable memory 220 is removed from the user-accessible communication endpoint 104 or 108 that is initially party to a call, and placed in another user-accessible communication endpoint 104 or 108 by the user, to allow the additional user-accessible communication endpoint 104 or 108 to join the call with the remote endpoint 112. In accordance with embodiments of the present invention, the removable memory 220 comprises solid state, non-volatile memory. Accordingly, examples of suitable memory formats include compact flash and secure digital memory cards. Of course, the memory slot 216, the call information transfer application 212, intermediate software or firmware provided for storing information to and reading information from removable memory 220, and the selected removable memory 220 format should be compatible with one another.

Various user input devices 224 and user output devices 228 may also be provided. Examples of user input devices 224 include a microphone, keyboard and numeric keypad. Examples of user output devices 228 include a speaker, alphanumeric display and ringer. In general, the user input 224 and user output 228 devices are provided to support voice and/or video telephony functions, and to allow a user to control various aspects of the operation of the associated user-accessible communication endpoint 104, 108.

A communication network interface 232 supports an interconnection between the user-accessible communication endpoint 104, 108 and the larger communication network or networks. Accordingly, examples of a communication network interface 232 include a cellular telephony transceiver or a wire line interface to the PSTN 116. Additional examples of a communication network interface 232 include a wire line Ethernet interface or wireless Wi-Fi interface.

In FIG. 3, aspects of a method for transferring calls between user-accessible communication endpoints in accordance with embodiments of the present invention are illustrated. At step 300, a call is initiated (or received) from (at) a first user-accessible communication endpoint 104, 108 to (or from) a remote communication endpoint 112. In general, the first user-accessible communication endpoint 104, 108 comprises one of a plurality of user-accessible communication endpoints 104, 108 that each can be placed in communication with the remote communication endpoint 112 via a communication network, such as the PSTN 116 and/or an IP network 128. The remote communication endpoint 112 is remote in that the call that is in place or that is being established between the user-accessible communication endpoint 104, 108 and the remote communication endpoint 112 is placed through a communication network 116 and/or 128. That is, physical remoteness between the user accessible communication endpoints 104, 108 and the remote communication endpoint 112 is not required.

At step 304, call information related to the call initiated from or received at the first user-accessible communication endpoint 104, 108 is stored in removable memory 220 associated with the first communication endpoint 104, 108. In accordance with embodiments of the present invention, storing the call information may be initiated or controlled by a call information transfer application 212 running on the first user-accessible communication endpoint 104, 108. The call information that is stored may comprise session information, such as the status of the call. Examples of call status include disconnected, call in progress, or connection in progress. Other call information that is stored includes the calling number and the called number. The time of day or other information required to make or complete a call may also be stored in the removable memory 220.

The user of the first user-accessible communication endpoint 104, 108 then removes the removable memory 220 from the slot 216 of the first user-accessible communication endpoint 104, 108 (step 308). The user then connects the removable memory 220 to the second user-accessible communication endpoint 104, 108, by placing the removable memory 220 in the removable memory slot 216 of the second user-accessible communication endpoint 104, 108 (step 312).

The second user-accessible communication device 104, 108 is then used to contact a network device or authority, and the call information related to the call between the first communication endpoint 104, 108 and the remote communication endpoint 112 is transferred or provided to the network device or authority (step 316). More particularly, in accordance with embodiments of the present invention, upon placing the removable memory 220 in the memory slot 216 of the second user-accessible communication device 104, 108, a call information transfer application 212 on the second user-accessible communication endpoint 104, 108 detects the removable memory 220, recognizes that the removable memory 220 contains call information, looks at the call status to recognize that the connection is in progress, and initiates a call to a network device or authority. As can be appreciated by one of skill in the art, where a connection is initiated by a remote communication endpoint 112 for which caller ID information is blocked, the calling number may not be available. Therefore, where the calling number is not available, the user of the communication device 104, 108 that is being joined to the call may be prompted by the call information transfer application 212 to provide the number of the remote communication endpoint 212. Accordingly, it can be appreciated that the second user-accessible communication device 104, 108 is joined to a call by calling into a network. This is in contrast to a conventional call forwarding or conferencing scenario, in which a communication endpoint to be joined to a call is called by another device or node.

A determination is then made as to whether the network device or authority recognizes the provided call information as identifying a call between the first user-accessible communication endpoint 104, 108 and the remote communication endpoint 112 (step 320). If the network device or authority recognizes the identified call, the network device forks or connects the identified call to the second user-accessible communication endpoint 104, 108 such that the first and second user-accessible communication endpoints 104 and 108 and the remote communication endpoint 112 are simultaneously interconnected to and in communication with one another (step 324). The second user-accessible communication endpoint 104, 108 may then participate in the call. It should be noted that the forking of the second user-accessible communication endpoint 104, 108 to the call does not result in information identifying the second user-accessible communication endpoint 104, 108 being transferred to the remote communication endpoint 112. For example, where the first user-accessible communication endpoint 104, 108 was used to initiate a call with the remote communication endpoint 112, the only caller I.D. information provided to the remote communication endpoint 112 is related to the first user accessible communication endpoint 104, 108.

At step 328, a determination may be made as to whether any of the user-accessible communication endpoints 104, 108 (or a remote communication endpoint 112) has been placed on hook. Generally, after any communication endpoint 104, 108 or 112 is placed on hook, the call will continue between remaining communication endpoints 104, 108, 112 (provided there are at least two such communication endpoints 104, 108, 112 and the call is not discontinued) (step 332). In a typical scenario, once removable memory 220 has been used to transfer call information to the second user-accessible communication endpoint 104, 108 so that the second user-accessible communication endpoint 104, 108 can join the call, the user will disconnect or place the first user-accessible communication endpoint 104, 108 on hook, and continue the call using the second user-accessible communication endpoint 104, 108. Accordingly, if the first communication endpoint 104, 108 is placed on hook, the call is continued between the second user-accessible communication endpoint 104, 108 and the remote communication endpoint 112. Alternatively, if the first user-accessible communication endpoint 104, 108 is not placed on hook, the call may continue with the first and second user-accessible communication endpoints 104 and 108 in communication with the remote communication endpoint 112, effectively placing the three communication endpoints 104, 108, 112 in a conference call (step 334). The number of user-accessible endpoints 104, 108 that can be added to a conference call is theoretically unlimited. In particular, the number of user-accessible endpoints 104, 108 that can be added to a call is limited only by the switch. Therefore, additional user-accessible endpoints 104, 108 can be added to the call by using the removable memory 220 to transfer call information to those additional endpoints 104, 108. There can also be any number of remote endpoints 112, subject to the limitations of the network switches. The call may continue until it is discontinued (step 336).

As can be appreciated by one of skill in the art from the description provided herein, embodiments of the present invention allow a user to select a particular user-accessible communication endpoint 104, 108 for use during a call, even where the call was initiated in connection with another user-accessible communication endpoint 104, 108. For example, where a user has received or initiated a call at a user-accessible communication endpoint 104, 108 comprising a desk telephone, that call can be seamlessly transferred to a second user-accessible communication endpoint 104, 108 comprising a cellular telephone if the user needs to leave their present location, but would like to continue the call. As another example, where a user has received or placed a call using a user-accessible communication endpoint 104, 108 comprising a cellular telephone, and the user has access to a VoIP telephone, the call can be transferred from the cellular telephone to the VoIP telephone in order to transfer from the relatively high cost cellular network to an Internet protocol network. Other exemplary situations in which embodiments of the present invention are particularly useful include conserving battery power or avoiding losing a call due to loss of power, avoiding roaming charges and avoiding dead spots.

The foregoing discussion of the invention has been presented for purposes of illustration and description. Further, the description is not intended to limit the invention to the form disclosed herein. Consequently, variations and modifications commensurate with the above teaching within the skill and knowledge of the relevant art, are within the scope of the present invention. The embodiments described here and above are further intended to explain the best mode presently known of practicing the invention and to enable others skilled in the art to utilize the invention in such or other embodiments and with various modifications required by their particular application or use of the invention. It is intended the appended claims be construed to include the alternative embodiments to the extent permitted by the prior art.

What is claimed is:

1. A method for transferring calls between communication endpoints, comprising:

one of receiving and initiating a call using a first communication endpoint, wherein said first communication endpoint is placed in communication with a remote communication endpoint, wherein call information relates to the call;

storing the call information in removable memory in communication with said first communication endpoint;

after said storing, removing said removable memory from said first communication endpoint while the call is active;

inserting said removable memory in a second communication endpoint;

calling a communication network device from said second communication endpoint;

providing said call information to said network device;

in response to said network device receiving said call information from said second communication endpoint, said network device determining that said call information relates to an active call; and said network device forking said call to said second communication endpoint and said first communication endpoint.

2. The method of claim 1, further comprising: disconnecting said first communication endpoint from said call.

3. The method of claim 2, wherein said call comprises a first call, the method further comprising:

after disconnecting said first communication endpoint from said first call, using said first communication endpoint to place a second call while said first call is in progress.

4. The method of claim 1, wherein said call is initiated using said first communication endpoint, wherein after said call is forked to said second communication endpoint said first communication endpoint is disconnected from said call, and wherein caller identification information provided to said remote communication endpoint comprises caller identification information related to said first communication endpoint.

5. The method of claim 4, wherein following disconnecting said first communication endpoint from said call, connection time related to said call is billed to said second communication endpoint and not to said first communication endpoint.

6. The method of claim 1, wherein said call is received using said first communication endpoint, and wherein following disconnecting said second communication endpoint from said call, connection time related to said call is billed to said second communication endpoint and not to said first communication endpoint.

7. The method of claim 1, wherein said removing said removable memory from said first communication endpoint and said inserting said removable memory in said second communication endpoint is performed by a user.

8. The method of claim 1, wherein said calling a communication network device from said second communication endpoint is performed while a call between said first communication endpoint and a remote communication endpoint is in progress or while a connection between said first communication endpoint and a remote communication endpoint is in progress.

9. The method of claim 1, wherein a call is not placed from said first communication endpoint to said second communication endpoint.

10. The method of claim 1, wherein said stored call information includes at least: a calling number, a called number, and session information.

11. The method of claim 10, wherein said stored call information further includes a time at which said call was placed for billing purposes.

12. The method of claim 1, wherein said removable memory comprises flash memory.

13. The method of claim 1, wherein a first one of said first and second communication endpoints comprises a cellular telephone, and wherein a second one of said first and second communication endpoints comprises a land line telephone.

14. A system for transferring or conferencing calls, comprising:

a first communication device, including:
a removable-memory port;
a second communication-device, including:
a removable memory port;
removable memory,
wherein in a first mode of operation said removable memory is interconnected to said first communication device and said first communication device is operable to store first call information regarding a first call in said removable memory, wherein said first communication device is a communication endpoint participating in said first call, wherein said first call is active,
wherein in a second mode of operation said removable memory is removed from said first communication device, while said first call is active, and is interconnected to said second communication device, and wherein said second communication device is adapted to read said first call information stored in said memory by said first communication device and to use said first call information to join said first call as a communication endpoint participating in said first call with the first communication endpoint.

15. The system of claim 14, further comprising:
a network device, wherein said network device is aware of said first call, and wherein said network device is operable to fork said first call to said second communication device in response to receiving said first call information.

16. The system of claim 14, wherein said first communication device comprises a first one of a cellular telephone or a wireline telephone, and wherein said second communication device comprises a second one of a cellular telephone or a wireline telephone.

17. The system of claim 14, wherein at least one of said first and second telephones comprises a soft Internet protocol phone.

18. A system for transferring calls between endpoints, comprising:

means for storing data;
first means for communicating, including:
means for removably receiving said means for storing data;
means for storing call information in said means for storing data;
second means for communicating, including:
means for removably receiving said means for storing data;
means for reading call information stored in said means for storing data;
means for forking a first call, between a remote means for communicating and said first means for communicating, to said second means and said first means for communicating in response to receiving said call information from said second means for communicating, wherein said second means for communicating is provided with said call information by removing, while the first call is active, said means for storing data containing said call information from said first means for communicating and placing said means for storing data in said second means for communicating.

19. The system of claim 18, wherein said call information comprises means for identifying a first call.

20. The system of claim 18, wherein said remote means for communicating, said first means for communicating, and said second means for communicating are placed in a conference call with one another.

* * * * *